United States Patent [19]

Kang

[11] Patent Number: 4,887,358
[45] Date of Patent: Dec. 19, 1989

[54] ELECTRONIC COMPASS

[76] Inventor: Insik Kang, 16945 Blackhawk St. #12, Granada Hills, Calif. 91344

[21] Appl. No.: 183,996

[22] Filed: Apr. 20, 1988

[51] Int. Cl.$^4$ .............................................. G01C 17/26
[52] U.S. Cl. .................................................. 33/363 K
[58] Field of Search ................ 33/363 K, 363 R, 354, 33/356, 355 R, 361, 360; 340/678; 250/231 R, 231 GY; 364/457

[56] References Cited

U.S. PATENT DOCUMENTS

| 2,236,543 | 4/1941 | McFaddan | 33/363 K |
| 3,100,889 | 8/1963 | Cannon | 340/678 |
| 3,833,901 | 9/1974 | Fowler | 33/363 K |
| 4,163,326 | 8/1979 | Edwards | 33/361 |
| 4,446,729 | 5/1984 | Watson, III | 33/363 K |
| 4,546,551 | 10/1985 | Franks | 33/361 |
| 4,564,909 | 1/1986 | Kramer | 33/363 K |
| 4,654,522 | 3/1987 | Gornick et al. | 250/237 G |

Primary Examiner—William A. Cuchlinski, Jr.
Assistant Examiner—Christopher Fulton
Attorney, Agent, or Firm—Albert O. Cota

[57] ABSTRACT

An electronic compass (10) comprising a circular semi-transparent wheel (12) mounted for rotation in a horizontal plane and carrying a bar magnet (14) mounted radially with the magnets south pole oriented outwardly to cause the wheel to function as a compass. The wheel (12) is provided with a gray scale (16) located around the wheels periphery. One or more light-emitting diodes (LEDs) (18) are mounted below the wheel (12) and a photoresistor (20) is mounted above the wheel in position to receive the light from the LEDs (18) passing through the wheel. The photoresistor provides a signal, indicative of the intensity of the light received to a voltage comparator circuit (22). The circuit (22), in turn, passes signals to a suitable display means (24) to provide a directional indication related to the position of the bar magnet (14). The circuit (22) includes an adjustment means to permit compensation for variations of the movement of the wheel from the correct directional indication as the compass is swung for calibration.

7 Claims, 3 Drawing Sheets

ELECTRONIC COMPASS

TECHNICAL FIELD

The invention pertains to the general field of navigation equipment and more particularly to electronic compasses.

BACKGROUND ART

Magnetic compasses have been used in navigation for several hundred years. However, as is well known, the presence of any substantial quantity of metal in proximity with the magnetic compass will cause the compass to provide a false reading. In early times, magnetic compasses were used primarily for navigating on foot, on horseback or on wooden ships. In all of these instances, the proximity of metal could easily be avoided. More recently, magnetic compasses have been used in aircrafts, automobiles and metal ships where the compass necessarily must perform in proximity with large quantities of metal. To overcome these problems, alternative forms of compasses have been proposed, such as flux gate compasses and gyroscopic compasses. Unfortunately, gyroscopic compasses are subject to precession and frequently must be reset to compensate for such precession. Moreover, both of these alternative forms of compasses are considerably more expensive than magnetic compasses to manufacture, purchase and maintain.

A search of the prior art did not disclose any patents that read directly on the claims of the instant invention. However, the following U.S. patents were considered related:

| PAT. NO. | INVENTOR | ISSUED |
| --- | --- | --- |
| 4,446,729 | Watson | 8 May 1984 |
| 4,146,970 | Edwards | 3 April 1979 |
| 4,117,602 | Lapeyre | 3 October 1978 |
| 3,786,571 | Kelman | 22 January 1974 |

The Watson patent discloses a sailing course computer that instantaneously and continuously computes a sailboat's speed towards a predetermined destination. A polarizer disk is used as a compass card through which a light source is directed. An anlayzer disk is positioned below the polarizer disk and a photocell below the analyzer disk provides a signal indicative of the amount of light passing through the two disks in response to the sailboat assuming various headings. A second signal input is provided by a knotmeter and electronic circuitry is then used to indicate the speed of the sailboat towards its destination.

The Edwards patent discloses a remote-indicating magnetic compass for use with automobiles or the like. The system consists of a dashboard-mounted readout unit that receives and decodes logic signals provided by a remotely located electro-optical shaft encoder. The encoder consists of alternate reflective and non-reflective circular sections on a circular disc, which modulate light source, as viewed by a phototransistor mounted on a housing. The phototransistor outputs produce codes at logic levels which determine compass shaft position. The readout unit receives and decodes the coded logic signals and produces a visual display of magnetic heading.

The Lapeyre patent discloses a magnetic compass in which the compass magnet is an electro-magnet. The electro-magnet is energized only when in a horizontal disposition to provide a correct heading indication without error do to tilting of the compass magnet. The compass uses a compass disk which is coded with indicia representative of compass headings. The indicia is sensed to provide an output signal representative of the sensed heading.

The Kelman patent discloses an audio compass suitable for installation in a vehicle or boat. The compass produces an audible sound that indicates a deviation of boat or vehicle from a desired course without requiring the operator to watch the compass. The compass functions by sensing a light source such as from a photocell. The light sensed is controlled by polarized transparent sheets associated with a magnetic compass, and includes circuit that is responsive to changes in the electrical characteristic of the photocells to produce audible tones of different frequencies. A first tone indication indicates a deviation to one side of a desired heading and a second tone indicates a deviation to the other side of the desired heading.

DISCLOSURE OF THE INVENTION

The improved electronic compass is designed to overcome many of the disadvantages of prior art compasses. The primary improvement consists of having an electronic heading readingout that can be compensated electronically for deviation of the magnetic compass from correct directional readings due to the proximity of significant quantities of metal or other disturbing influences. Moreover, the compass of the present invention is relatively inexpensive to manufacture and to maintain.

The advantages of the present invention are preferably attained by providing a semi-transparent wheel mounted for rotation in a horizontal plane. The wheel includes a bar magnet mounted radially thereof and has the south pole of the magnet oriented outwardly to cause the wheel to function as a compass. The wheel is provided with a gray scale located around the periphery of the wheel. One or more light-emitting diodes (LEDs) are mounted below the wheel and a photoresistor is mounted above the wheel in position to receive light from the LEDs passing through the wheel. As the wheel rotates, the photoresistor passes signals, indicative of the intensity of the light received by the photoresistor, to a voltage comparator network. From this network, the signals are applied to suitable display means to provide a directional indication related to the position of the bar magnet.

An adjustment means is provided for the voltage comparator network to permit compensation for variations of the movement of the wheel from the correct directional indication as the compass is swung for calibration. Once calibrated, the compass will provide accurate directional indications despite the presence of substantial quantities of metal in the vicinity of the compass.

Accordingly, it is the primary object of the present invention to provide an improved electronic compass.

Another object of the present invention is to provide a magnetic compass which will provide accurate directional indications despite the presence of substantial quantities of metal in the vicinity of the compass.

A further object of the present invention is to provide a magnetic compass having electronic readout means including adjustment means to permit compensation of the readout for inaccuracies in the movement of the magnet.

A specific object of the present invention is to provide a compass comprising a semi-transparent wheel mounted for rotation in a horizontal plane. The wheel has a bar magnet mounted radially thereof, with the south pole of said magnet oriented outwardly to cause the wheel to function as a compass. The wheel is also provided with a gray scale located around the periphery thereof. One or more light-emitting diodes (LEDs) are mounted below the wheel and a photoresistor is mounted above the wheel in position to receive light from the LEDs passing through the gray side of the wheel. The photoresistor passes signals, indicative of the intensity of the light received by the photoresistor, to a voltage comparator network which, in turn, passes signals to a suitable display means to provide a directional indication related to the position of said bar magnet. An adjustment means is also included to allow the voltage comparactor network to compensate for variations of the movement of the wheel from the correct directional indication as the compass is swung for calibration.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the electronic compass of the present invention is presented in terms of a preferred embodiment that is primarily designed to provide an electronic readout for a magnetic compass. The compass includes an adjustment means to permit compensating for deviation in the movement of the magnetic compass due to proximal location of significant quantities of metal or other factors effecting the rotation of the compass.

Figure 1:
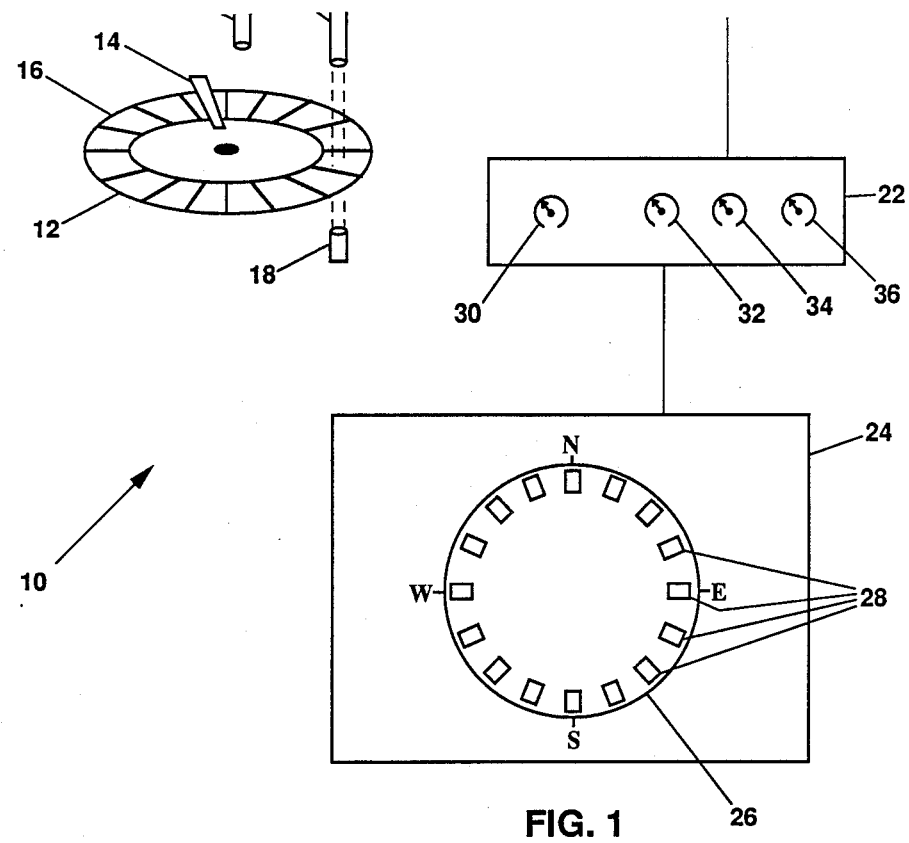
FIG. 1 is a diagrammatic representation of a compass embodying the present invention.
Figure 3:
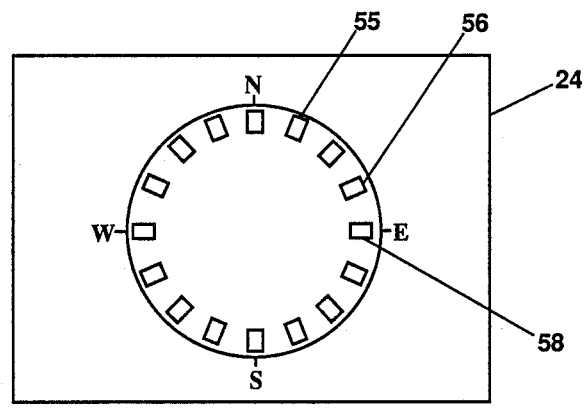
FIG. 3 is a diagrammatic representation illustrating the deviation compensation technique of the compass of FIG. 1.
Figure 2:
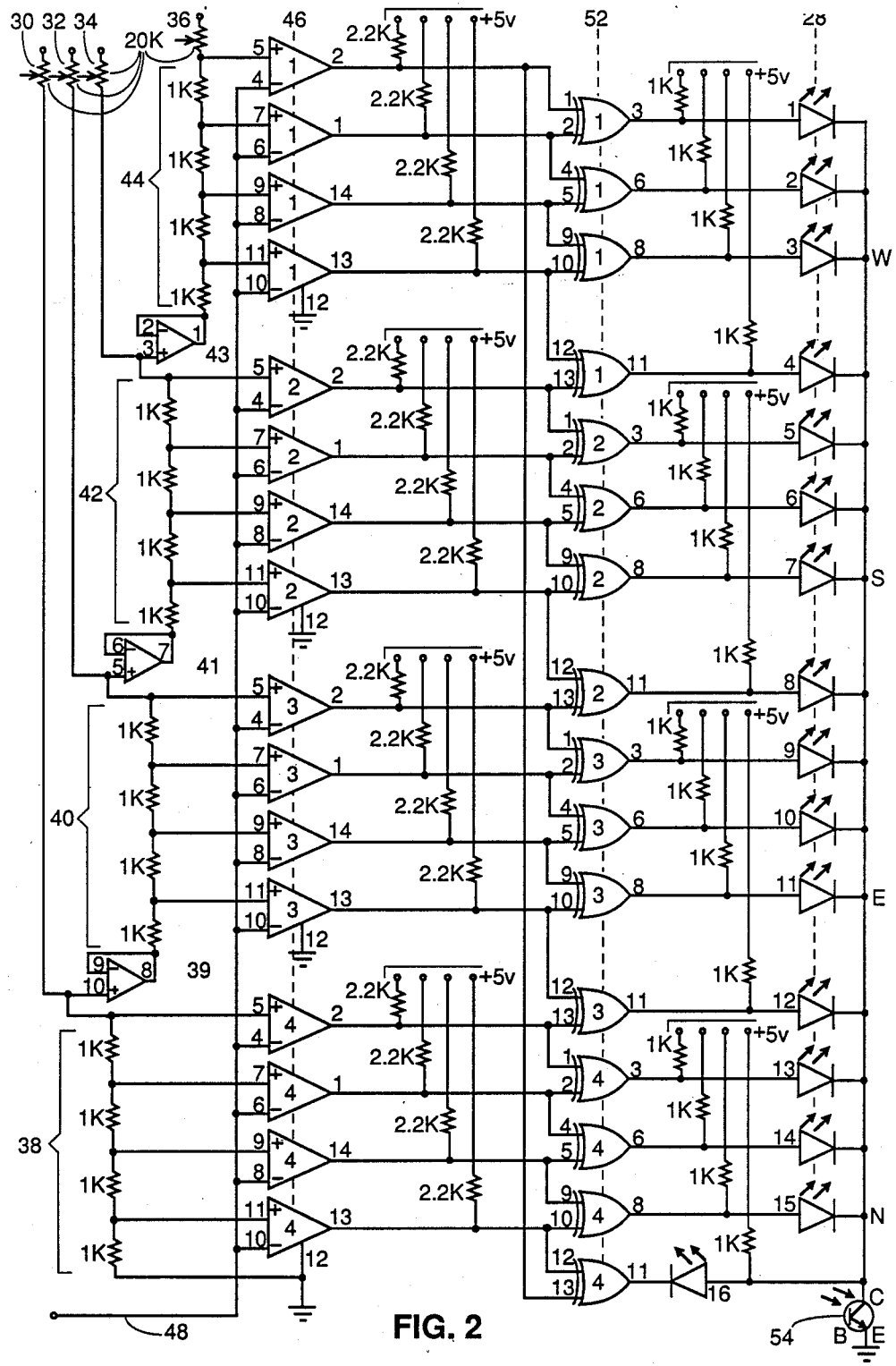
FIG. 2 is a circuit diagram of the voltage comparator of the compass of FIG. 1.
Figure 2A:
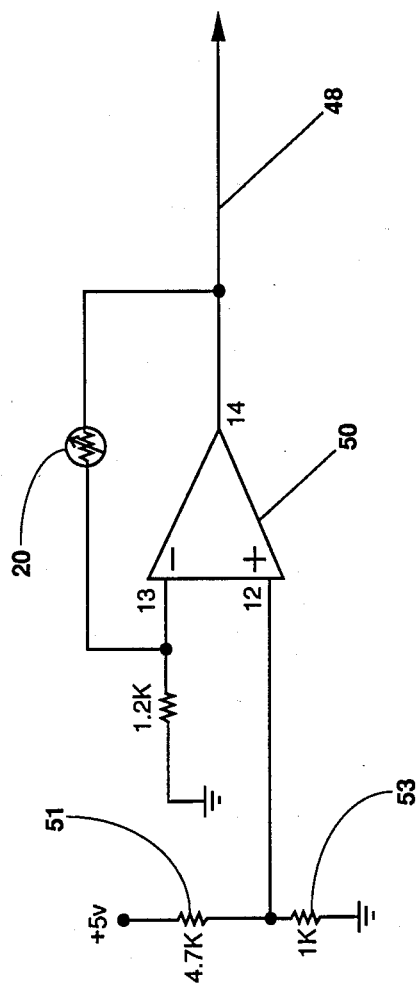
FIG. 2A is a circuit diagram of the photoresistor of the compass of FIG. 1.

The preferred embodiment, as shown in FIGS. 1 through 3, is comprised of the following major elements: a magnetic compass, indicated generally at 10, that further comprises a circular semi-transparent wheel 12 which is mounted to be freely rotatable in a horizontal plane. The wheel 12 has a bar magnet 14 radially disposed with the south pole of the magnet oriented outwardly to cause the wheel 12 to align with magnetic north. A gray scale 16 is carried by the wheel 12 that has a plurality of progressive shades of gray with sixteen shades preferred so that each shade corresponds to one of sixteen points of the compass (north, north northeast, northeast, east northeast, east, etc.). One or more light source LEDs 18 are positioned below the wheel 12 and a photoresistor 20 is mounted above the wheel 12 to receive the light, from the light source LEDs 18, passing through the wheel 12 and gray scale 16. The output of the photoresistor 20 is directly proportional to the intensity of the light received from the light source LEDs 18 through the wheel 12 and gray scale 16 and, hence is directly proportional to the rotational position of the wheel.

The signal from the photoresistor 20 is passed to a voltage comparator circuit 22 which selects and illuminates a suitable directional display means 24. As seen in FIG. 1, the display means 24 comprises a compass rose 26 having sixteen display LEDs 28 mounted thereon and positioned to correspond to the sixteen compass points noted above.

The voltage comparator 22 also includes suitable adjustment means, such as rheostats 30, 32, 34 and 36. These rheostats allow adjustment of the signal output by the voltage comparator 22 to permit compensation for deviation in the rotational action of wheel 12 and magnet 14. The deviation is due to the presence of substantial quantities of metal in the vicinity of other factors influencing the rotation of the wheel 12.

As seen in FIG. 2, the electronic portion of the compass 10 is energized by a suitable 12 volt d-c source, not shown. The power is applied through rheostats 30, 32 34 and 36 and corresponding resistor banks 38, 40, 42 and 44, each having four resistor elements therein, to one input of a bank of sixteen voltage comparator units 46, such as a National Semiconductor LM 339 voltage comparator. In addition, a plurality of operational amplifiers 39, 41 and 43, each connected between a respective pair of the resistor banks 38, 40, 42 and 44. The amplifiers permit independent adjustment of the voltage across the resistor banks to cause the signals through each of the resistor banks to represent a respective quadrant of the compass rotation. The other input of the voltage comparator units 46 is supplied with signals from the photoresistor 20 through conductor 48. As shown, the photoresistor 20 is connected in parallel with an operational amplifier 50 which has one input thereof connected through biasing resistors 51 and 53 to a suitable 5-volt d-c source.

The voltage comparator units 46 each serve to compare the voltage of the signal received from the photoresistor 20 via conductor 48 with the voltage of the respective signals received thereby through their individual combination of the rheostats 30, 32, 34 or 36 and the voltage comparator units 46 passes a respective signal to one side of a corresponding one of a bank of sixteen exclusive OR gates 52, such as a Texas Instruments 74136 exclusive-OR gates.

As each of the exclusive OR gates 52 is triggered, it passes a signal to a suitable display means 24, in this case, one of the sixteen display LEDs 28. As seen, the LEDs 28 are biased by a 5-volt d-c signal derived from the 12-volt d-c source, not shown, through a voltage regulator. The output of the display LEDs 28 is connected to ground through a phototransistor 54 which is mounted adjacent the photoresistor 20 above wheel 12. The phototransistor 54 serves to sense the transition at the end of the gray scale 16 between the lightest and darkest shades of the gray scale 16° C.

In use, the bar magnet 14 will serve to rotate wheel 12 in the manner of a conventional magnetic compass. As the wheel 12 rotates, the light source LEDs 18 will emit light which will pass through wheel 12 and gray scale 16 to the photoresistor 20. The rotational position of the wheel 12 will determine which area of the gray scale 16 is interposed between the light source LEDs 18 and the photoresistor 20 and, hence, will determine the intensity of the light observed by the photoresistor 20. Thereafter, the signal from the photoresistor 20 will be passed through the voltage comparator 22 to provide an appropriate signal to the display means 24 indicative of the directional position of the magnet 14 and wheel 12.

In calibrating a compass, it is conventional to take the vehicle with the compass mounted thereon to a so-called "compass range" where known directional position indicators are available and to note the reading of the new compass as the vehicle is "swung" to point successively to the various compass points. As this is done, it is frequently found that, due to the presence of substantial quantities of metal in the vicinity of the compass or other disturbing factors, the directional indication provided by the new compass does not agree with the known direction. This will, obviously, be the case when the compass is installed in a metal vehicle, such as an automobile or aircraft. Thus, as seen in FIG. 3, when the vehicle is pointed toward what is known to be north, the new compass may indicate north northeast, as seen by LED 55 in FIG. 3, and when the vehicle is pointed toward what is known to be east, the new compass may indicate east northeast, as seen by LED 56 in FIG. 3.

It will be apparent that the swing from north to east must produce a corresponding 90° movement of the new compass. In the past, magnetic means have usually been employed to attempt to compensate for such deviation. However, such compensation techniques have usually been only partially successful and it has usually been necessary to provide a deviation card for the compass on which uncorrectable deviation was noted so as to permit accurate navigation with the compass despite the uncorrectable deviation. In contrast, with the compass of the present invention, the voltage comparator 22 divides the signals into four quadrants, as indicated by the four resistor banks 38, 40, 42 and 44 and the signals through each of these is adjustable by means of the corresponding one of the rheostats 30, 32, 34 and 36. Thus, if the vehicle is rotated from north to east, but the magnet 14 and wheel 12 rotate only an amount corresponding to movement from north northeast, as indicated by LED 55 in FIG. 3, to east northeast, as indicated by LED 56 in FIG. 3, electronic compensation of the compass 10 of the present invention can be accomplished as follows. If movement of the wheel 12 through 360∨ corresponds to an electrical signal through the voltage comparator 22 equal to 12 volts, the movement from north to east would correspond to a voltage of 3-volts, whereas the movement from north northeast, indicated by LED 55, to east northeast, as indicated by LED 54, would correspond to only 1.5 volts.

To correct for this anomaly, rheostat 30 can be adjusted to decrease the reference voltage signal corresponding to movement of the wheel 12 between LED 55 and LED 56 to 1.5-volts to cause the display means 24 to indicate east, as shown by the dashed LED 58 in FIG. 3.

Next, the vehicle may be swung from known east to known south and rheostat 32 may be adjusted to cause compass 10 to provide an accurate reading. Subsequently, the vehicle may be swung from known south to known west and rheostat 34 may be adjusted to cause the compass 10 to provide the correct reading.

Finally, the vehicle may be swung from known west to known north and rheostat 36 may be adjusted. Thereafter, the compass 10 will overcome the effect of the nearby metal or other disturbing influence and will correctly and accurately indicate the proper direction.

While the invention has been described in complete detail and pictorially shown in the accompanying drawings, it is not to be limited to such details, since many changes and modifications may be made to the invention without departing from the spirit and the scope thereof. For example, it will be apparent to those skilled in the art that, instead of employing the LEDs 28 in the display means 24, the signals from the exclusive OR gates 52 could be supplied to the appropriate inputs of a plurality of pixel elements to provide a numerial display corresponding to the number of degrees from north. Furthermore, it will be obvious that, if desired, the light source LEDs 18 could be mounted above the wheel 12 with the photoresistor 20 mounted below the wheel 12. Additionally, the number of gray scale 16 shades and corresponding number of LEDs 18 can be increased or decreased to accommodate special cases. Also, if the compass 10 is installed on similar model vehicles, the rheostats 30, 32, 34 and 36 can be replaced with fixed resistors once the directional deviation values are determined. Hence, it is described to cover any and all modifications and forms which may come within the language and scope of the claims.

I claim:

1. An electronic compass comprising:
    (a) a wheel formed of transparent material and mounted for rotation in a horizontal plane,
    (b) a gray scale having a plurality of shades and carried by said wheel,
    (c) a magnet carried by said wheel to cause said wheel to seek magnetic north,
    (d) a light source mounted adjacent tone surface of said wheel,
    (e) photoresponsive means mounted adjacent a surface of said wheel opposite said light source to generate an electrical signal indicative of the intensity of light from said source passing through said gray scale,
    (f) voltage comparator means connected to receive the signals from said photoresponsive means and to compare said signals to a known voltage to derive a signal indicative of the rotational position of said wheel, and
    (g) a compass rose having a plurality of light emitting diodes positioned about said compass rose at locations corresponding to respective compass points, said light emitting diodes being activated by appropriate signals from said voltage comparator providing a visual indication of the orientation of said wheel with respect to magnetic north.

2. An electronic compass comprising:
    (a) a wheel formed of transparent material and mounted for rotation in a horizontal plane,
    (b) a gray scale having sixteen shades and carried by said wheel,
    (c) a magnet carried by said wheel to cause said wheel to seek magnetic north,
    (d) a light source mounted adjacent one surface of said wheel,
    (e) photoresponsive means mounted adjacent a surface of said wheel opposite said light source to generate an electrical signal indicative of the intensity of light from said source passing through said gray scale,
    (f) voltage comparator means connected to receive the signals from said photoresponsive means and to compare said signals to a known voltage to derive a signal indicative of the rotational position of said wheel, and (g) display means responsive to the signals from said voltage comparator means for providing a visual indication of the orientation of said wheel with respect to magnetic north.

3. An electronic compass comprising:
(a) a wheel formed of transparent material and mounted for rotation in a horizontal plane,
(b) a gray scale having a plurality of shades and carried by said wheel,
(c) a magnet carried by said wheel to cause said wheel to seek magnetic north,
(d) a light source mounted adjacent one surface of said wheel,
(e) photoresponsive means mounted adjacent a surface of said wheel opposite said light source to generate an electrical signal indicative of the intensity of light from said source passing through said gray scale,
(f) voltage comparator means connected to receive the signals from said photoresponsive means and to compare said signals to a known voltage to derive a signal indicative of the rotational position of said wheel, and
(g) a compass rose having sixteen light emitting diodes corresponding with the sixteen gray scale shades where said light emitting diodes are positioned about said compass rose at locations corresponding to respective compass points, said light emitting diodes being activated by appropriate signals from said voltage comparator providing a visual indication of the orientation of said wheel with respect to magnetic north.

4. An electronic compass comprising:
(a) a wheel formed of transparent material and mounted for rotation in a horizontal plane,
(b) a gray scale having a plurality of shades and carried by said wheel,
(c) a magnet carried by said wheel to cause said wheel to seek magnetic north,
(d) a light source mounted adjacent one surface of said wheel,
(e) photoresponsive means mounted adjacent a surface of said wheel opposite said light source to generate an electrical signal indicative of the intensity of light from said source passing through said gray scale, and
(f) a voltage comparator connected to receive the signals from said photoresponsive means and to compare said signals to a known voltage to derive a signal indicative of the rotational position of said wheel, wherein said voltage comparator comprises:
(1) a source of known voltage,
(2) a plurality of voltage comparator units each having one input thereof connected to said voltage source and the other input connected to receive signals from said photoresponsive means, and
(3) a plurality of exclusive-OR gates each having their inputs connected to receive signals from a respective pair of said voltage comparator units and serving to supply signals to a display means responsive to the signals from said voltage comparator for providing a visual indication of the orientation of said wheel with respect to magnetic north.

5. An electronic compass comprising:
(a) a wheel formed of transparent material and mounted for rotation in a horizontal plane,
(b) a gray scale having a plurality of shades and carried by said wheel,
(c) a magnet carried by said wheel to cause said wheel to seek magnetic north,
(d) a light source mounted adjacent one surface of said wheel,
(e) a photoresistor mounted adjacent a surface of said wheel opposite said light source to generate an electrical signal indicative of the intensity of light from said source passing through said gray scale, and
(f) a voltage comparator connected to receive the signals from said photoresistor and to compare said signals to a known voltage to derive a signal indicative of the rotational position of said wheel, wherein said voltage comparator comprises:
(1) a source of known voltage,
(2) a plurality of voltage comparator units each having one input thereof connected to said voltage source and the other input connected to receive signals from said photoresistor, and
(3) a plurality of exclusive-OR gates each having their inputs connected to receive signals from a respective pair of said voltage comparator units and serving to supply signals to a display responsive to the signals from said voltage comparator means for providing a visual indication of the orientation of said wheel with respect to magnetic north.

6. An electronic compass comprising:
(a) a wheel formed of transparent material and mounted for rotation in a horizontal plane,
(b) a gray scale having a plurality of shades and carried by said wheel,
(c) a magnet carried by said wheel to cause said wheel to seek magnetic north,
(d) a light source mounted adjacent one surface of said wheel,
(e) photoresponsive means mounted adjacent a surface of said wheel opposite said light source to generate an electrical signal indicative of the intensity of light from said source passing through said gray scale, and
(f) a voltage comparator connected to receive the signals from said photoresponsive means and to compare said signals to a known voltage to derive a signal indicative of the rotational position of said wheel, wherein said voltage comparator comprises:
(1) a source of known voltage,
(2) a plurality of voltage comparator units each having one input thereof connected to said voltage source and the other input connected to receive signals from said photoresponsive means,
(3) a plurality of exclusive-OR gates each having their inputs connected to receive signals from a respective pair of said voltage comparator units and serving to supply signals to a display means,
(4) four banks of resistors each connected between said voltage source and a respective group of said voltage comparator units, and
(5) four variable resistance means each connected between said voltage source and a respective one of said bands of resistors to permit variation of the voltage supplied to the associated bank of resistors to permit variation of the voltage supplied to the associated bank of resistors to permit compensation of the signals supplied to said display means responsive to the signals from said voltage comparator for providing a visual indication of the orientation of said wheel with respect to magnetic north.

7. an electronic compass comprising:
  (a) a wheel formed of transparent material and mounted for rotation in a horizontal plane,
  (b) a gray scale having a plurality of shades and carried by said wheel,
  (c) a magnet carried by said wheel to cause said wheel to seek magnetic north,
  (d) a light source mounted adjacent one surface of said wheel,
  (e) photoresponsive means mounted adjacent a surface of said wheel opposite said light source to generate an electrical signal indicative of the intensity of light from said source passing through said gray scale,
  (f) voltage comparator means connected to receive the signals from said photoresponsive means and to compare said signals to a known voltage to derive a signal indicative of the rotational position of said wheel, wherein said voltage comparator comprises:
  (1) a source of known voltage,
  (2) a plurality of voltage comparator units each having one input thereof connected to said voltage source and the other input connected to receive signals from said photoresponsive means,
  (3) a plurality of exclusive-OR gates each having their inputs connected to receive signals from a respective pair of said voltage comparator units and serving to supply signals to a display means,
  (4) four banks of resistors each connected between said voltage source and a respective group of said voltage comparator units,
  (5) a plurality of operational amplifiers, each connected between a respective pair of said resistor banks to permit independent adjustment of the voltage across said resistor banks to cause the signals through each of said resistor banks to represent a respective quadrant of the compass rotation, and
  (6) four variable resistance means each connected between said voltage source and a respective one of said banks of resistors to permit variation of the voltage supplied to the associated bank of resistors to permit variation of the voltage supplied to the associated bank of resistors to permit compensation of the signals supplied to said display means responsive to the signals from said voltage comparator means for providing a visual indication of the orientation of said wheel with respect to magnetic north.

* * * * *